(12) United States Patent
Cherkasova et al.

(10) Patent No.: US 8,909,603 B2
(45) Date of Patent: Dec. 9, 2014

(54) BACKING UP OBJECTS TO A STORAGE DEVICE

(75) Inventors: Ludmila Cherkasova, Sunnyvale, CA (US); Bernhard Kappler, Herrenberg (DE)

(73) Assignee: Hewlett-Packard Development Company, L. P., Houston, TX (US)

( * ) Notice: Subject to any disclaimer, the term of this patent is extended or adjusted under 35 U.S.C. 154(b) by 214 days.

(21) Appl. No.: 12/705,635

(22) Filed: Feb. 15, 2010

(65) Prior Publication Data

US 2011/0202504 A1 Aug. 18, 2011

(51) Int. Cl.
*G06F 17/30* (2006.01)
*G06F 11/14* (2006.01)

(52) U.S. Cl.
CPC ................... *G06F 11/1451* (2013.01)
USPC .......................................... 707/654; 707/652

(58) Field of Classification Search
USPC .......... 707/640, 647, 652, 654, 811, E17.058, 707/999.204; 711/162, 168
See application file for complete search history.

(56) References Cited

U.S. PATENT DOCUMENTS

| | | | |
|---|---|---|---|
| 5,673,381 A * | 9/1997 | Huai et al. ........................ | 714/1 |
| 6,473,781 B1 * | 10/2002 | Skagerwall et al. .......... | 709/201 |
| 6,934,724 B1 * | 8/2005 | Deshayes et al. .................... | 1/1 |
| 7,051,112 B2 * | 5/2006 | Dawson ........................ | 709/232 |
| 2009/0300633 A1 * | 12/2009 | Altrichter et al. ............. | 718/103 |
| 2009/0307283 A1 * | 12/2009 | Lehr et al. ..................... | 707/204 |

* cited by examiner

*Primary Examiner* — Ajay Bhatia
*Assistant Examiner* — Miranda Huang

(57) ABSTRACT

One embodiment is a method that backups up objects to a storage device. A number of objects that are concurrently backed up to the storage device is limited.

15 Claims, 7 Drawing Sheets

BACKING UP OBJECTS TO A STORAGE DEVICE

BACKGROUND

Unstructured data is a large and fast growing portion of assets for companies and often represents a significant portion of online data. Analyzing and managing this unstructured data is a high priority for many companies. Further, as companies implement enterprise-wide content management (such as information classification and enterprise search) and as the volume of data in the enterprises continues to increase, establishing a data management strategy becomes more challenging.

Backup management also faces challenges to manage large amounts of unstructured data. Backup systems are required to process increasing amounts of data while meeting time constraints of backup windows.

DETAILED DESCRIPTION

Example embodiments are directed to scheduling and managing backups of data. One embodiment combines one or more attributes from an LBF (longest backup first) scheduling algorithm, a BBG (balanced backup groups) algorithm, and a DA (disk agent) analysis algorithm.

The BBG algorithm automates the process of assigning and backing up groups of objects to tapes drives. The BBG algorithm uses historic information about the backup time of different objects representing different mount points of the same client machines. This helps to avoid manual configuration efforts by system administrators trying to achieve efficient backup and retrieval of data.

The LBF algorithm uses historic information about the object backup processing time and suggests a job scheduling where the objects with longest projected backup time are scheduled first.

The DA-analysis algorithm determines a minimum required number of disk agents in a backup system for optimizing an overall backup time. The method automates configuration of the backup tool with either a minimum number of disk agents or a minimum number of tape drives in the backup system required for efficient processing of a given workload.

By using historical information from previous backups, example embodiments reduce overall backup processing time (e.g., LBF), automate management tasks for creating balanced backup groups (e.g., BBG), and optimize resource usage via automated parameter tuning (e.g., DA-analysis).

System servers often have multiple mount points (objects) that are backed up. Backup processing that uses a random object scheduling can have increased backup time. Under an LBF schedule, the objects with longest backup are scheduled first which reduces the backup time. However, both random scheduling and the LBF scheduling might assigned the objects that represent different mount points of the same server for processing to different concurrent disk agents at the same time. If this situation happens then the concurrent streams share the same server networking card and share the same networking path. This sharing leads to reduced bandwidth available to each stream, and as a result to the increased backup time for these objects.

One embodiment uses a new tag for each object that reflects or identifies the server to which this object belongs. This tag is used in example embodiments for a performance optimization which limits a number of objects from the same server for being scheduled at the same time. Limits on the number of objects are established by a system administrator or computer program.

Tape Library and Backup Tool

A functionality of a backup tool is built around a backup session and the objects (mount points or filesystems of the client machines) that are backed up during the session. This architecture of a backup tool can be used in storage systems, such as a tape library.

Figure 1:
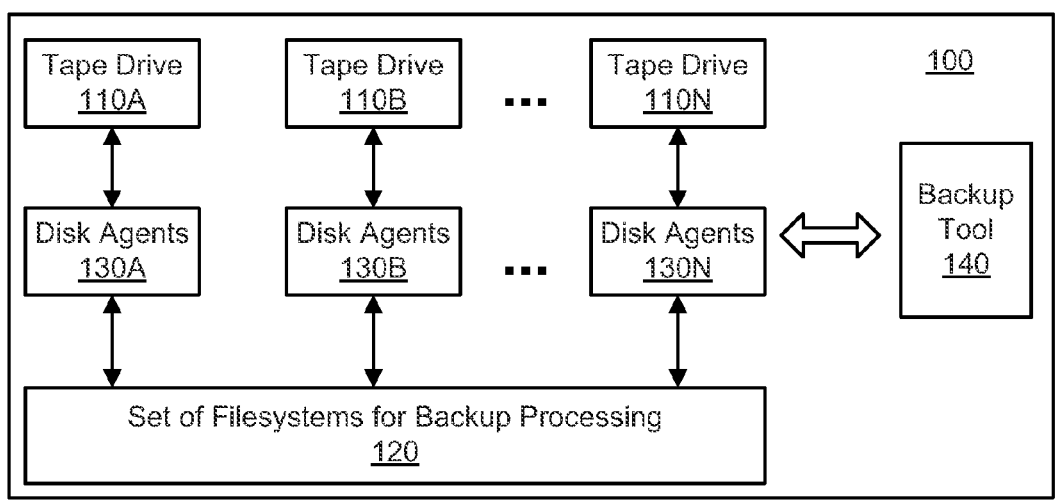
FIG. 1 shows a backup system having multiple tape drives backing up a set of objects with multiple disk agents in accordance with an example embodiment.

FIG. 1 shows a backup system 100 having multiple tape drives (110A, 110B, ... 110N) backing up a set of objects 120 with multiple disk agents (130A, 130B, ... 130N). Each drive has one or more disk agents to perform backup operations. A backup tool 140 manages the backup of the objects or filesystems to the tape drives.

By way of example, assume there are 4 to 6 tape drives (e.g., each solution comes with a fixed number of tape drives, such as 4 drives in FIG. 1). Each tape drive has a configuration parameter which defines a level of concurrency, i.e., a number of concurrent processes or disk agents (e.g., shown as disk agents 130A ... 130N) which can backup different objects in parallel to the tape drives. Traditionally, backup is performed in this manner because a single data stream generated by a disk agent copying data from a single object cannot fully utilize the capacity/bandwidth of the backup tape drive due to a slower client machine. To optimize the total backup throughput, a system administrator can configure up to 32 disk agents for each tape drive to enable concurrent data streams from different objects at the same time. The drawback of such an approach is that the data streams from 32 different objects are interleaved on the tape. When data of a particular object needs to be restored there is a higher restoration time for retrieving such data compared with a continuous, non-interleaved data stream written by a single disk agent.

When a group of N objects is assigned to be processed by the backup tool 140, traditionally a way does not exist to define a sequence or order in which these objects are processed by the backup tool. Typically, any available disk agent is assigned for processing to any object from the set, and the objects (that might represent different mount points of the same client machine) can be written to different tape drives.

In other words, there is no way to define an order in which the objects are processed by concurrent disk agents to the different tape drives. Potentially, this can lead to an inefficient backup processing and an increased backup time.

Figure 2A:
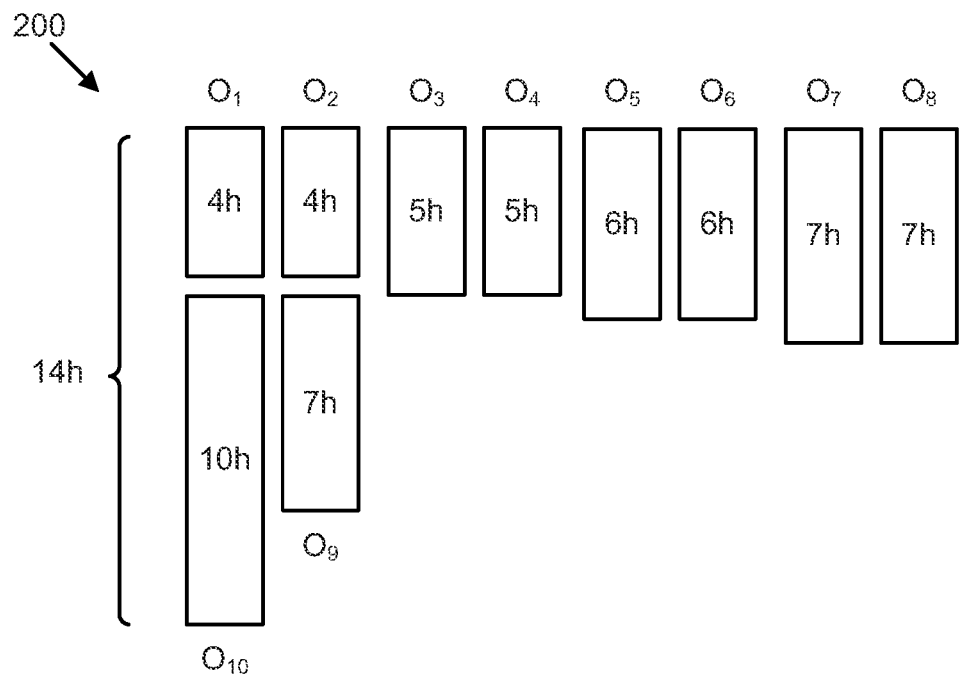
FIG. 2A shows blocks of backup times for filesystems with random scheduling in accordance with an example embodiment.

The following is an example that illustrates inefficient backup processing. Let there be ten objects O1, O2, . . . , O10, in a backup set 120, and let the backup tool have four tape drives (110A-110D) each configured with 2 concurrent disk agents as shown in FIG. 1 (i.e., with eight disk agents in the system). Let these objects take approximately the following time for their backup processing: T1=T2=4 hours, T3=T4=5 hours, T5=T6=6 hours, T7=T8=T9=7 hours, and T10=10 hours. If the disk agents randomly select the following eight objects O1, O2, O3, . . . , O7, O8 for initial backup processing then object O9 and O10 will be processed after the backup of O1 and O2 are completed (since backup of O1 and O2 take the shortest time of 4 hours), and the disk agents which became available will then process O9 and O10. FIG. 2A shows blocks of backup times 200 for filesystems or objects with random scheduling in accordance with this scenario.

Figure 2B:
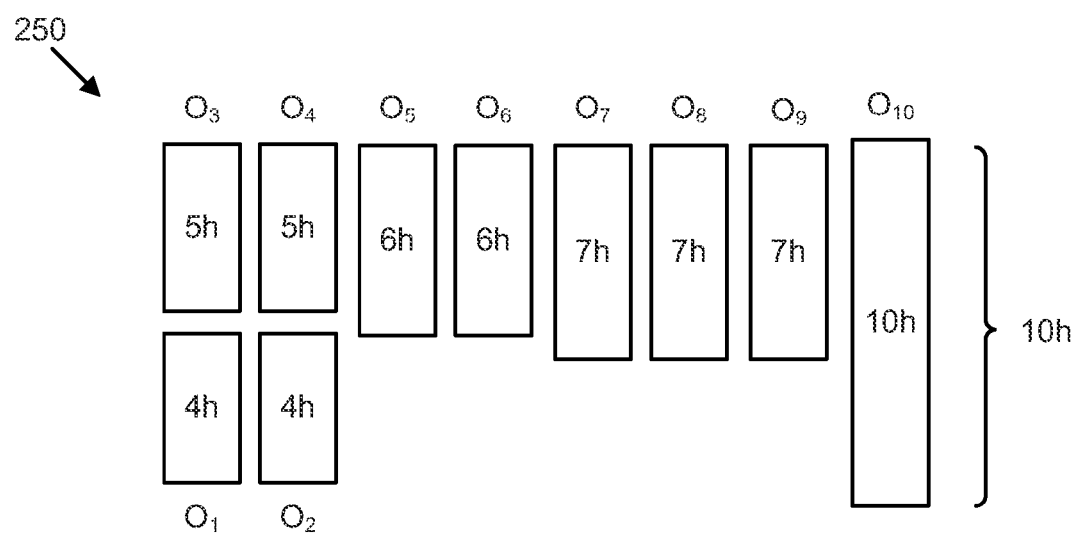
FIG. 2B shows blocks of backup times for filesystems with optimized scheduling in accordance with an example embodiment.

An optimal scheduling for this group is to process first the following eight objects instead: O3, O4, . . . , O10. When processing of O3 and O4 is completed after 5 hours, the corresponding disk agents will backup the remaining objects O1 and O2. If the object processing follows this new ordering schema then the overall backup time is 10 hours for the entire group of backup times 250 for filesystems as shown in FIG. 2B.

Inefficiency of such a backup tool is magnified since an enterprise environment might have hundreds of objects for backup processing. As discussed below, one example embodiment uses an additional job scheduler in the backup solution. This backup scheduler optimizes the overall backup time and helps avoid manual configuration efforts by system administrators trying to achieve the same performance goal.

LBF+ Algorithm to Optimize the Overall Backup Time

The backup tools record useful monitoring information about performed backups. Example embodiments discuss the efficient management of full backups (i.e., when data of the entire object is processed during a backup) and not incremental backups which only process modified and newly added files from the object and which are typically short and light in nature.

Figure 3:
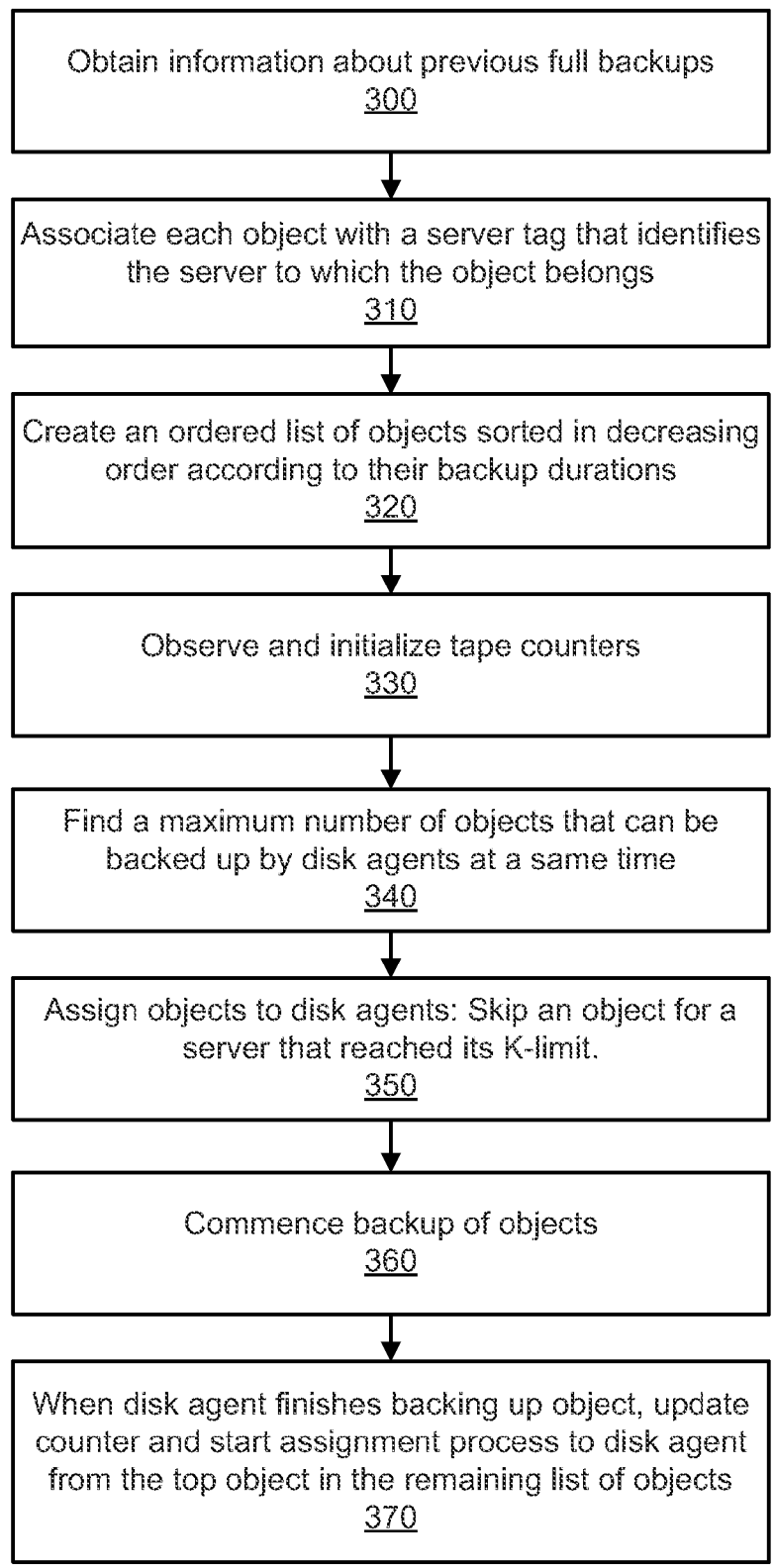
FIG. 3 shows an LBF+ algorithm for scheduling and performing backup of objects in accordance with an example embodiment.

FIG. 3 shows an LBF+ algorithm for scheduling and performing backup of objects in accordance with an example embodiment.

According to block 300, for an upcoming full backup, one embodiment obtains information about one or more previous or historic full backups. For example, for each full back up of an object, there is recorded information on the number of processed files, the total number of transferred bytes, and the elapsed backup processing time. Example embodiments use the historic information on duration for processing of the backup jobs (the jobs which were successfully completed).

According to block 310, each object is identified or associated with a server tag that identifies the server to which the object belongs. For example, each server is provided with a unique number or identification.

According to block 320, an ordered list of objects sorted in decreasing order of their backup durations is created or generated. By way of example, this ordered list of objects is created as follows:

$$\text{OrderedObjectList} = \{(Ob^{S1}_1, Dur_1), \ldots, (Ob^{Sn}_n, Dur_n)\}$$

where $Dur_j$ denotes the backup duration of object $Ob^{Sj}_j$, and $$Dur_1 \geq Dur_2 \geq Dur_3 \geq \ldots \geq Dur_n.$$

Note the added server tag $s_j$ in the object definition: $Ob^{Sj}_j$ which means that this object (mount point) belongs to server $s_j$.

According to block 330, the tape counters and/or drives are observed and initialized.

Let the overall backup list have S servers for processing. Let $S^{act} = \{s_1, \ldots, s_S\}$ denote a vector to reflect the so-called active servers over time, i.e., the servers which have established active sessions at this time. This vector is initialized with 0 prior to the beginning of a full backup:

$$S^{act} = \{0, \ldots, 0\}.$$

According to block 340, find a maximum number of objects that can be backed up by disk agents at a same time.

Let $K^{limit}$ be the maximum number of objects from the same server or storage device that can be backed up by concurrent disk agents at any time. $K^{limit} \geq 1$. Thus, each disk agent is provided with a number that limits the number of objects that each disk agent can simultaneously backup from a single or same server. Note that $K^{limit}$ can be defined for the entire system (i.e., all the servers have the same constraint K limit as well as it can be defined as a vector with different values per server: ($K^{limit}_{s1}, \ldots, K^{limit}_{Ss}$). Without a loss of generality the algorithms below are considered a single constraint $K^{limit}$ defined for the entire system.

Let there be N tape drives: $Tape_1, \ldots, Tape_N$, and each tape drive be configured with k disk agents. We observe the following running counters per each tape drive $Tape_i$:

DiskAgent$_i$—a counter of available (not busy) disk agents of tape drive $Tape_i$; and TapeProcTime$_i$—a counter of overall processing time assigned to tape drive $Tape_i$.

For each tape drive $Tape_i$ ($1 \leq i \leq N$) these counters are initialized as follows:

$$\text{DiskAgent}_i = k$$

$$\text{TapeProcTime}_i = 0.$$

The iteration step of the algorithm is described as follows:

Let ($Ob^{Sj}_j$, $Dur_j$) be the top object in the OrderedObjectList, and let $$\text{TapeProcTime}_m = \min_{1 \leq i \leq N \,\&\, \text{DiskAgent}_i > 0} (\text{TapeProcTime}_i),$$

i.e., the tape drive $Tape_m$ has the smallest assigned processing time, and it still has an available disk agent that can process the object $Ob_j$.

According to block 350, assign objects to disk agents: Skip an object for a server that reached its $K^{limit}$.

If the number of objects of the server $s_j$ in the active servers vector $S^{act}$ has reached the limit $K^{limit}$, i.e., $S^{act}[j] = K^{limit}$, then object $Ob^{Sj}_j$ is skipped at this round and the next object in the list OrderedObjectList, is considered for the assignment. If there are no other objects for assignment or they are all from the same server then it is the exceptional situation, and the considered object $Ob^{Sj}_j$ is assigned for processing.

If the number of objects of the server $s_j$ in the active servers vector $S^{act}$ is less than $K^{limit}$, i.e., $S^{act}[j] \leq K^{limit}$, then object $Ob^{Sj}_j$ is assigned for processing to the available disk agent at the tape drive $Tape_m$, and the running counters of this tape drive are updated as follows:

$$\text{TapeProcTime}_m = \text{TapeProcTime}_m + Dur_j$$

$$\text{DiskAgent}_m = \text{DiskAgent}_m - 1.$$

Also, vector of active servers is updated as follows:

$$S^{act}[j] = S^{act}[j] + 1$$

Intuitively, under this algorithm, the longest jobs are assigned to be processed first. In addition, the job assignment to concurrent disk agents occurs in such a way that to balance the overall amount of processing time assigned to different tape drives and allows a limited number K limit of the objects from the same server be backed up at the same time.

This algorithm assigns the longest jobs to be processed first. For example, one embodiment assigns agents based on a priority in which objects having a longest job duration (i.e., longest time to complete backup operation from start to finish) are assigned and executed first. Objects having a shortest job duration (i.e., shortest time to complete backup operation from start to finish) are assigned and executed last. The priority thus executes backup operations based on a hierarchy of time required to backup the object of filesystem. Further, in one embodiment, the job assignment to concurrent disk agents is performed to balance the overall amount of processing time assigned to different tape drives.

According to block 360, commence backup of objects. Once the disk agents are assigned some objects, the backup processing starts.

According to block 370, when disk agent finishes backing up an object, update the counter and start assignment process to the disk agent from the top object in the remaining list of objects.

When a disk agent at a tape drive $Tape_m$ completes the backup of the assigned object $Ob^{Sj}_j$, the running counter of this tape drive is updated as follows:

$$DiskAgent_m = DiskAgent_m + 1$$

and the active servers vector is updated as follows:

$$S^{act}[i] = S^{act}[i] - 1.$$

Then the disk agent of this tape drive starts its assignment process with the top object form the remaining list of OrderedObjectList. The running counters are updated again, and the backup process continues.

BBG Algorithm

Figure 4:
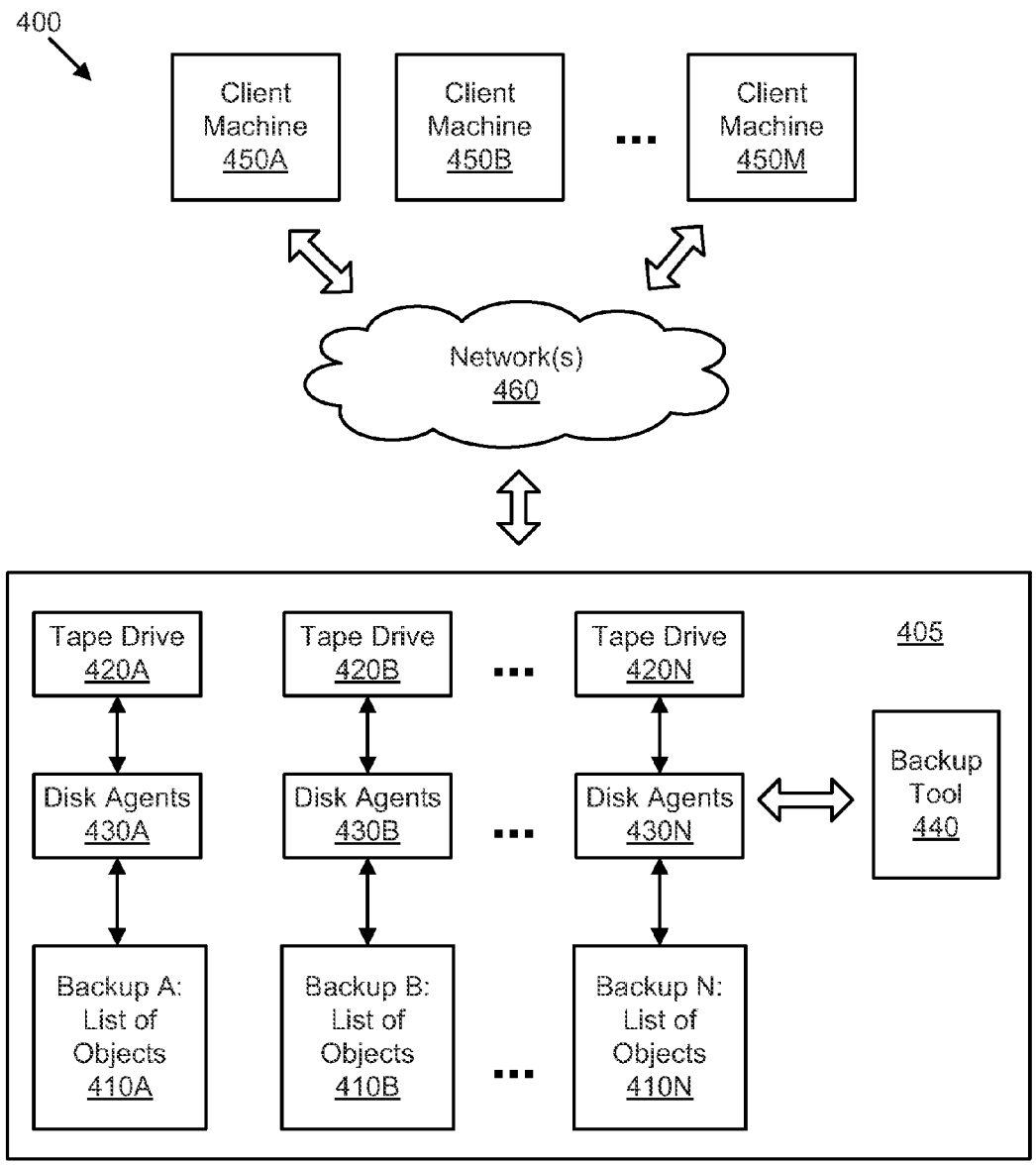
FIG. 4 shows a storage system with a tape library with groups of filesystems being assigned for backup to tape drives in accordance with an example embodiment.

FIG. 4 shows a storage system 400 that includes a tape library 405 with groups of filesystems being assigned for backup to storage devices, such as tape drives. The library 405 includes a set of objects or filesystems (shown as 410A, 410B, to 410N) being backed-up to storage devices, such as tape drives (shown as 420A, 420B, to 420N) using multiple disk agents (shown as 430A, 430B, to 430N). A backup tool 440 manages the backup of the filesystems to the tape drives. A plurality of client machines, hosts, or servers (shown as 450A, 450B, to 450M) communicates with the library 405 through one or more networks 460.

Under a traditional approach, when a group of N objects is assigned for backup processing, a way does not exist to define a sequence or order in which these objects are processed by the backup tool. Typically, any available disk agent is assigned for processing to any object from the set. Further, the objects that represent different mount points of the same client machine might be written to different tapes. This situation can even occur for smaller client machines when the backed up client data are spread across multiple tapes.

One option is to manually create the backup groups, which are assigned to different tape drives for processing in order to control the number of tapes that are used per server. For example, a system administrator can designate or assign the list of objects in group A (410A) to tape drive 420A, the list of objects in group B (410B) to tape drive 420B, etc. Here, each group is assigned a single tape drive.

This approach of assigning and backing up groups of objects to single tape drives is efficient when the created groups are well balanced and take approximately the same time for processing. Even if manually created groups are well balanced, however, a method does not exist to define an order in which the objects are processed within the groups by concurrent disk agents. Potentially, this approach still leads to an inefficient backup processing and an increased backup time.

One embodiment automates the process of assigning and backing up groups of objects to tapes drives by using an algorithm (referred herein as BBG). The BBG algorithm uses historic information about the backup time of different objects representing different mount points of the same client machines. This helps to avoid manual configuration efforts by system administrators trying to achieve efficient backup and retrieval of data.

Figure 5:
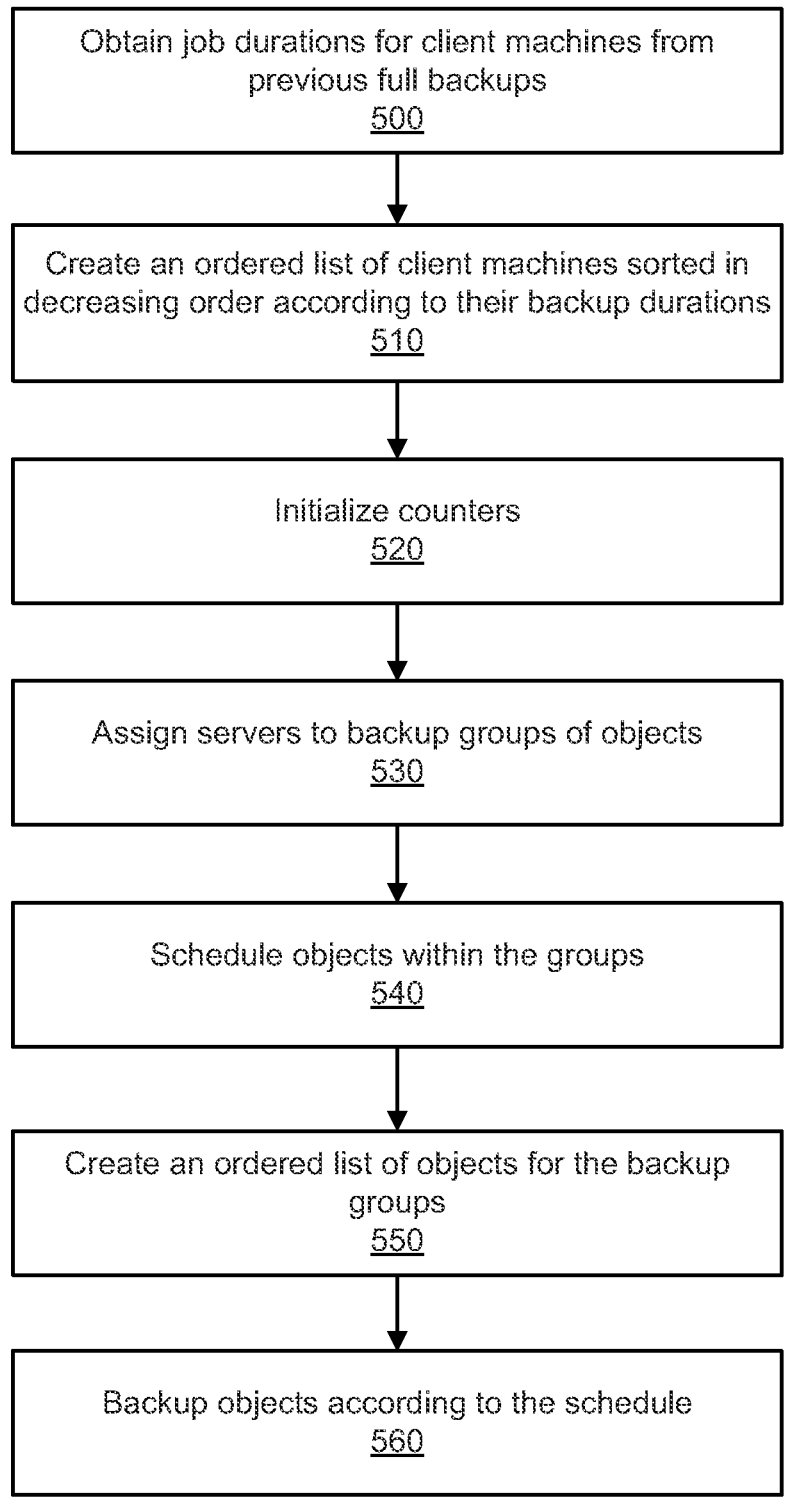
FIG. 5 shows a method of assigning and backing up groups of objects to storage devices in accordance with an example embodiment.

FIG. 5 shows a method of assigning and backing up groups of objects to storage devices (for illustration, the method described as BBG algorithm).

According to block 500, job durations from client machines from previous or historical backups is obtained.

According to block 510, an ordered list of client machines (each might have multiple objects for backup processing) is created and sorted in decreasing order according their backup durations from a previous full backup. For example, an ordered server list is as follows:

$$OrderedServerList = \{(S_1, Dur_1) \ldots, (S_n, Dur_n)\}$$

where $Dur_r$ denotes the backup duration of client server $S_r$, and $$Dur_1 \geq Dur_2 \geq Dur_3 \geq \ldots \geq Dur_n.$$

Note, that if server $S_r$ is comprised of multiple objects as $$(Ob^j_r, Dur^j_r) \ (1 \leq j \leq M_r)$$

then $$Dur_r = \sum_{1 \leq j \leq M_r} Dur^j_r$$

According to block 520, one or more counters are initialized. For example, let there be N tape drives: $Tape_1$, $Tape_2, \ldots, Tape_N$. Further, let $TapeProcTime_i$ be a running counter of the overall processing time assigned to tape drive $Tape_i$ ($1 \leq i \leq N$).

According to block 530, the servers are assigned to backup groups of objects or filesystems. For example, the server assignment to different backup groups is defined by the following iteration step of the algorithm.

Let $(S_r, Dur_r)$ be the top server In the OrderedServerList, and let $$TapeProcTime_m = \min_{1 \leq j \leq M_r}(TapeProcTime_i),$$

i.e., tape drive $Tape_m$ has the smallest assigned processing time. Then $S_r$ is assigned for processing to the backup group at the tape drive $Tape_m$, and the running counter of this tape drive is updated as follows:

$$TapeProcTime_m \Leftarrow TapeProcTime_m + Dur_r.$$

After that the next server from the ordered list OrderedServerList is considered for the assignment.

According to block 540, objects are scheduled within the assigned backup group. For example, after all the servers from the list are assigned to backup groups, there is a second stage of the algorithm for object scheduling within the created backup groups.

According to block 550, to avoid processing inefficiency within the backup group, the algorithm creates an ordered list of objects for this backup group (sorted in decreasing order of their job durations) and schedules them in a similar way as described in connection with FIG. 3.

According to block 560, the objects are backed up according to the schedule.

The method of FIG. 5 automates the creation of balanced backup groups to limit the number of tapes the client data are written to, while also achieving a backup time reduction. The algorithm divides the filesystems into backup groups such that each of the backup groups takes approximately a same amount of time to backup to the storage device. By simultaneously backing up the filesystems in the backup groups to the storage device with the agents, optimization is achieved through a reduced backup time. One embodiment thus reduces a number of tapes used to backup the filesystems by balancing the backup groups such that each group completes backup operations at approximately a same time.

One embodiment computes average backup times over a period of time (for example, weeks or months) from previous backups of the filesystems. For example, the backup times for a filesystem are divided by the total number of backups to determine an average. This average is then used to represent the backup duration for a current backup and assign priority to the agents for backing up the filesystem.

The BBG+ Algorithm

The Algorithm BBG+ is different than the BBG algorithm in that after all the servers from the list are assigned to the backup groups, there is a second stage of the algorithm for object scheduling within the created backup groups. Example embodiments apply the LBF+ scheduling within the groups as discussed in connection with FIG. 3.

DA+ Algorithm

The LBF and LBF+ algorithms have a number of concurrent disk agents per a tape drive as the algorithm parameter. However, a fixed number of concurrent disk agents per a tape drive can lead to inefficient backups.

Let there be N tape drives: $Tape_1, Tape_2 \ldots, Tape_N$; and each tape drive be originally configured with k default disk agents. Hence, the following equation $$NumGr = N \times k$$

defines a default value of overall number of disk agents available in the system with a default configuration.

The original DA algorithm finds the minimum number NumGr of overall disk agents required in the system to support the optimal backup time. This minimum number is found when there is not a restriction that different objects from the same server can be assigned for processing to concurrent disk agents at the same time or with processing time overlap.

Figure 6:
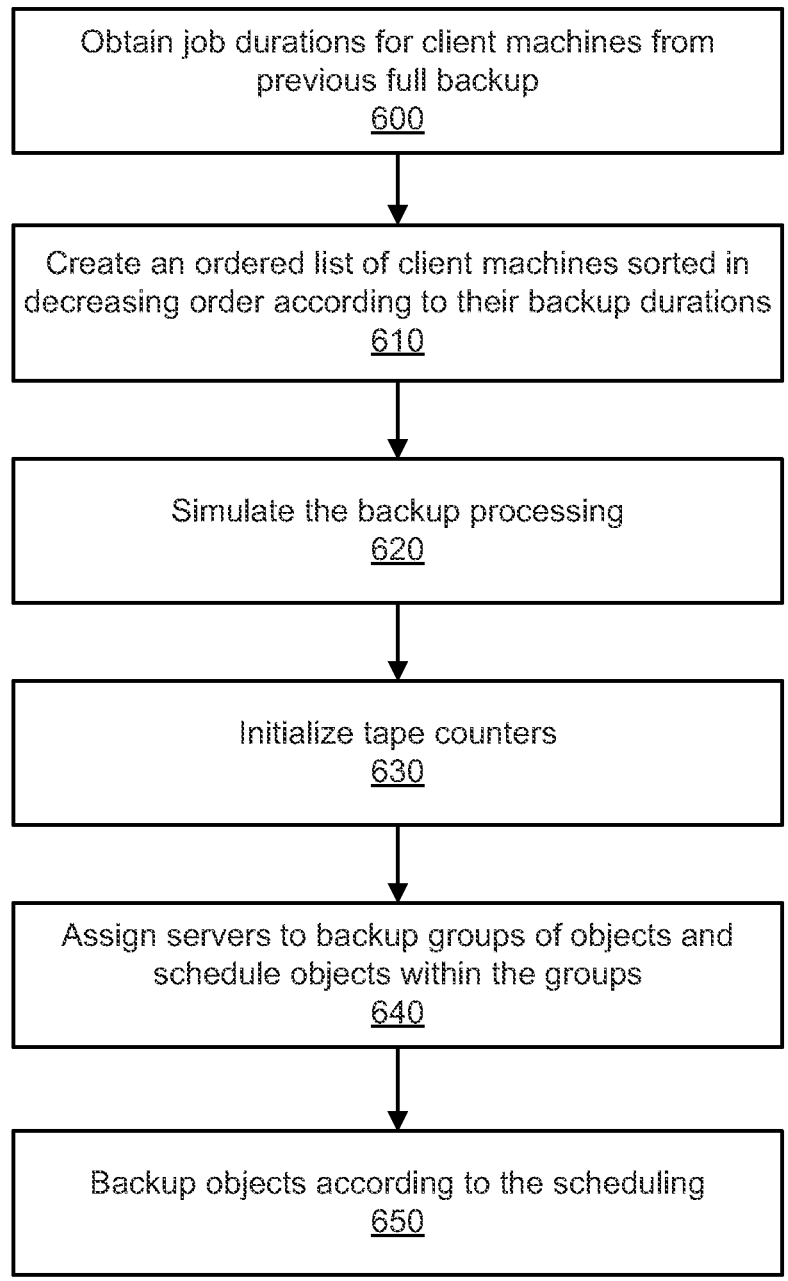
FIG. 6 shows a DA+ algorithm to find a minimum number of disk agents for an optimal backup in accordance with an example embodiment.

FIG. 6 shows a DA+ algorithm to find a minimum number of disk agents for an optimal backup in accordance with an example embodiment of the present invention.

According to block 600, job durations of client machines is obtained from the previous full backups.

According to block 610, an ordered list of client machines is created and sorted in decreasing order according to their backup durations as follows:

$$OrderedObjectList = \{(Ob^{S1}_1, Dur_1) \ldots, (Ob^{Sn}_n, Dur_n)\}$$

where $Dur_j$ denotes the backup duration of object $Ob^{Sj}_j$, and $$Dur_1 \geq Dur_2 \geq Dur_3 \geq \ldots Dur_n.$$

Note the added server tag $s_i$ in the object definition: $Ob^{Sj}_j$ which means that this object (mount point) belongs to server $s_j$.

According to block 620, the backup processing is simulated.

The backup processing is simulated by assigning the backup jobs from the ordered list OrderedObjectList to $Group_1 \ldots, Group_{NumGr}$ according to the LBF+ scheduling algorithm. The object assignment is simulated using the following iteration step.

Let $GroupProcTime_i$ ($1 \leq i \leq NumGr$) be a counter for overall processing time assigned to group $Group_i$ and which is initialized as $GroupProcTime_i = 0$.

Let the overall backup have S servers to process. Let $S^{act} = \{Ts_1, \ldots, T_{sS}\}$ denote a vector where each position is a list of timestamps ($t^{Si}_1 \ldots, t^{Si}_2$) that reflects the number of concurrent active sessions for server $s_i$ and the end time of these sessions.

Vector $S^{act}$ is initialized with 0 prior to the beginning of a full backup:

$$S^{act} = \{0 \ldots, 0\}$$

Let $K^{limit}$ be the maximum number of objects from the same server that can be backed up by concurrent disk agents at any time. $K^{limit} \geq 1$.

Let $(Ob_j, Dur_j)$ be the top object in the OrderedObjectList, and let $$GroupProcTime_m = \min_{1 \leq i \leq N} (GroupProcTime_i),$$

i.e., $Group_m$ has the smallest assigned processing time.

Example embodiments verify whether the $Ob^{Sj}_j$ can be added for processing at this time $GroupProcTime_m$ (i.e., whether the existing constraints do not limit this assignment). So, if the $Ob^{Sj}_j$ can be added for processing then processing for this object would start at time $GroupProcTime_m$, and processing would be finished at $GroupProcTime_m + Dur_j$.

To verify these times, the timestamps are checked that reflect active sessions for server $s_j$ in the $S^{act}[j]$. As an initial event, the existing list is cleaned. Further, all of the timestamps are removed that are less than $GroupProcTime_m$ because these sessions would finish by this time (one example embodiment uses "lazy" updates of the active servers list over time).

If the number of remaining timestamps is equal to specified $K^{limit}$ then the $Ob^{Sj}_j$ cannot be added for processing at this time, and the next object from the list OrderedObjectList is considered.

If the number of remaining timestamps is strictly less than the specified $K^{limit}$ then the $Ob^{Sj}_j$ is assigned for processing to group $Group_m$, and the running counter of this group is updated as follows:

$$GroupProcTime_m = GroupProcTime_m + Dur_j$$

and a new timestamp $GroupProcTime_m + Dur_j$ is added to the $S^{act}[j]$.

After the assignment of all the objects from the list is completed, computation of the following occurs:

$$MaxProcTime_{NumGr} = \max_{1 \leq i \leq N} (GroupProcTime_i).$$

The computed time $MaxProcTime_{NumGr}$ defines the overall backup processing time under the default system parameters. Then the number of disk agents in the system is decreased as follows:

$$NumGr = NumGr - 1,$$

and the algorithm repeats the backup processing simulation for the decreased number of groups NumGr−1.

If MaxProcTimeNumGr=MaxProcTime$_{NumGr-1}$ then the same backup processing time can be achieved with a decreased number of disk agents in the system. Example embodiments repeat the DA+ analysis routine until a minimum number of disk agents is found in the system that ensures the optimized backup time while avoiding unnecessary interleaving of data streams at the tape drives.

According to block 630, the tape counters are initialized.

According to block 640, servers are assigned to backup groups, and objects in the groups are scheduled.

According to block 650, the objects are backed up according to the scheduling.

Figure 7:
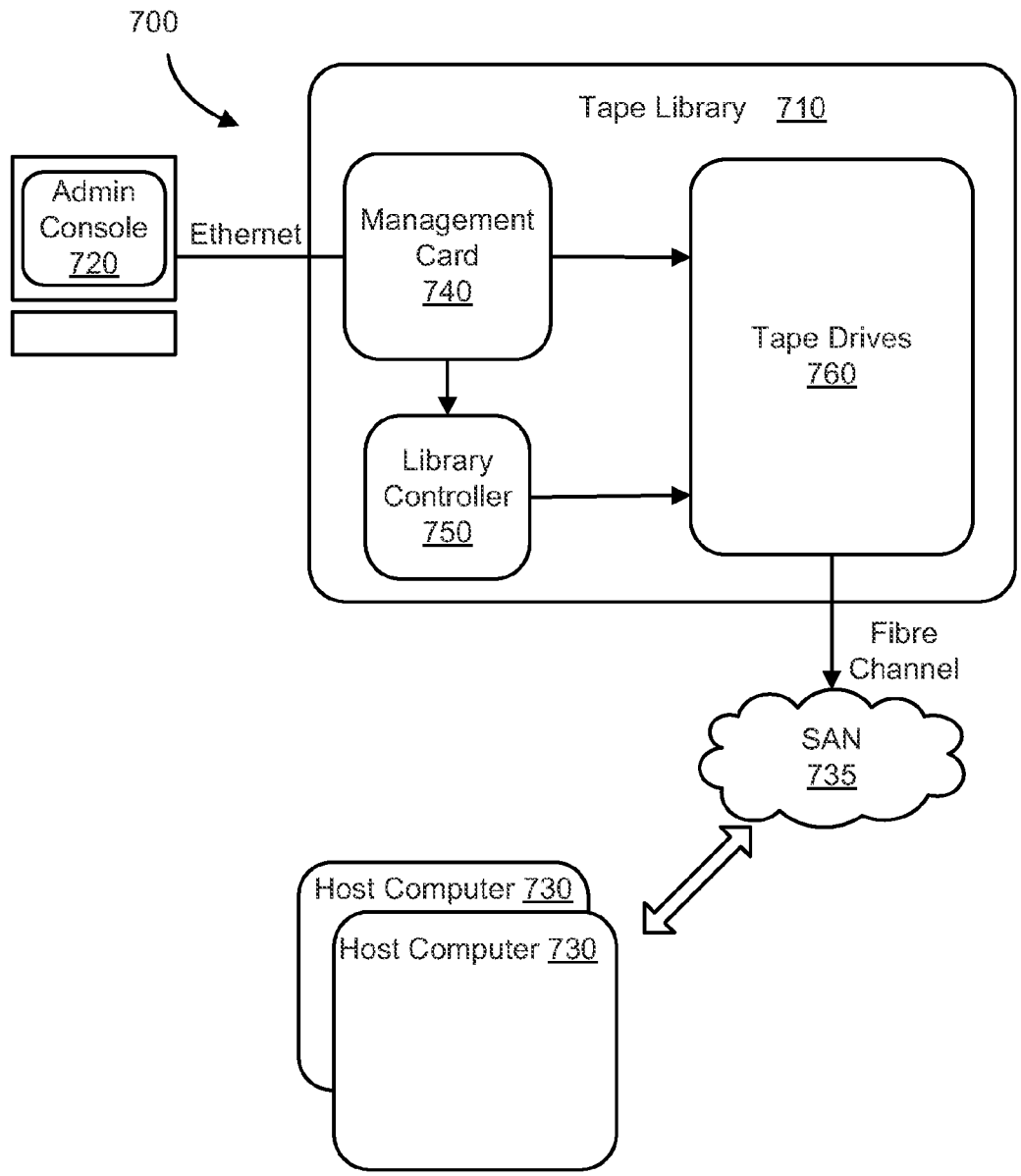
FIG. 7 shows an exemplary storage system in accordance with an example embodiment.

FIG. 7 is an exemplary storage system 700 in accordance with an example embodiment. The storage system includes a tape library 710 connected to an administrative console 720 and one or more host computers 730 via one or more networks (for example, shown as a storage area network 735 or SAN).

The tape library 710 includes a management card 740 coupled to a library controller 750 and one or more tape drives 760. In one embodiment, the administrative console 720 enables a user or administrator to select and/or administer backup of data according to example embodiments discussed herein. The library controller is used to execute one or more methods and/or algorithms according to example embodiments discussed herein.

Embodiments in accordance with the present invention are utilized in a variety of systems, methods, and apparatus. For illustration, example embodiments are discussed in connection with a tape library. Example embodiments, however, are applicable to other types of storage systems, such as storage devices using cartridges, hard disk drives, optical disks, or movable media. Furthermore, method disclosed herein can be executed by a processor, a controller, a server, a storage device, a computer, or other type of computing device.

DEFINITIONS

As used herein and in the claims, the following words are defined as follows:

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible computer-readable media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a storage device, comprising:
   determining information, including a duration of time for performing a backup operation for each of one or more objects;
   assigning a server tag to each of the one or more objects that identifies which server is the source of each of the one or more objects;
   ordering, in a time descending order based on the durations of time, the one or more objects to be backed up;

determining a maximum number of objects from each server that can be backed up by multiple disk agents at the storage device concurrently during a period of time;

assigning some of the one or more objects, according to the time descending order, to the multiple disk agents without exceeding the maximum number of objects;

performing, during the period of time, a first backup operation of the assigned one or more objects to the storage device by using the multiple disk agents; and in response to a first disk agent from the multiple disk agents completing backup of an assigned object within the period of time while at least one other disk agent is still performing the first backup operation, assigning another object from objects that have not been assigned for the first backup operation to the first disk agent so that the first disk agent can perform a subsequent backup operation of the other assigned object within the period of time while the at least one other disk agent is still performing the first backup operation.

2. The method of claim 1, wherein assigning some of the one or more objects includes skipping an object to be backed up from a server when a number of objects to be backed up from the server exceeds the maximum number of objects for the server.

3. The method of claim 1, wherein assigning some of the one or more objects includes assigning a disk agent to backup an object from a server when a number of objects to be backed up at the server is less than the maximum number of objects for the server.

4. The method of claim 1, wherein the maximum number of objects limits a number of objects from a server to be backed up at a same time.

5. The method of claim 1, further comprising, executing a simulation of backing up the one or more objects to the storage device to determine a processing time to backup the one or more objects with a given number of disk agents.

6. The method of claim 1, wherein the storage device is a tape library that includes multiple tape drives.

7. The method of claim 1, wherein performing the first backup operation includes backing up the assigned one or more objects by combining attributes from an LBF (longest backup first) scheduling algorithm, a BBG (balanced backup groups) algorithm, and a DA (disk agent) analysis algorithm.

8. A tangible computer readable storage medium having instructions for causing a computer to execute a method, comprising:

determining information, including a duration of time for performing a backup operation for each of one or more objects to be backed up on a storage device;

assigning a server tag to each of the one or more objects that identifies which server is the source of each of the one or more objects;

ordering, in a time descending order based on the durations of time, the one or more objects to be backed up;

determining a maximum number of objects from each server that can be backed up by multiple disk agents at the storage device concurrently;

assigning some of the one or more objects, according to the time descending order, to the multiple disk agents without exceeding the maximum number of objects;

performing a first backup operation of the assigned one or more objects to the storage device by using the multiple disk agents; and in response to a disk agent from the multiple disk agents completing backup of an assigned object, assigning another object from objects that have not been assigned for the first backup operation to the disk agent so that the disk agent can perform a subsequent backup operation.

9. The tangible computer readable storage medium of claim 8, wherein the storage device is a tape library having multiple tape drives.

10. The tangible computer readable storage medium of claim 8, wherein the durations of time are determined from historic data, the historic data being based on a number of processed files, a number of transferred bytes, and time to perform backup operations.

11. The tangible computer readable storage medium of claim 8, further comprising, iterating a method that simulates backing up the objects to the storage device to calculate a maximum processing time to backup the objects with a given number of disk agents.

12. A tape library comprising:

a plurality of tape drives; and a controller that executes a backup algorithm to:

determine information, including a duration of time for performing a backup operation for each of one or more objects;

assign a server tag to each of the one or more objects that identifies which server is the source of each of the one or more objects;

order, in a time descending order based on the durations of time, the one or more objects to be backed up to the tape drives;

determine a maximum number of objects, for each server, that can be backed up by multiple disk agents at the tape library concurrently during a period of time;

assign some of the one or more objects, according to the time descending order, to the multiple disk agents without exceeding the maximum number of objects;

perform, during the period of time, a first backup operation of the assigned objects to the plurality of tape drives by using the multiple disk agents; and in response to a first disk agent from the multiple disk agents completing backup of an assigned object within the period of time while at least one other disk agent is still performing the first backup operation, assign another object from objects that have not been assigned for the first backup operation to the first disk agent so that the first disk agent can perform a subsequent backup operation of the other assigned object within the period of time while the at least one other disk agent is still performing the first backup operation.

13. The tape library of claim 12, wherein the controller executes the backup algorithm to assign some of the one or more objects by skipping an object to be backed up when a number of objects to be backed up from a server exceeds the maximum number of objects.

14. The tape library of claim 12, wherein the controller executes the backup algorithm to further obtain historic data from a number of processed files, a number of transferred bytes, and time to perform backup operations.

15. The tape library of claim 12, wherein the controller further executes the backup algorithm to further simulate backing up objects to the tape library to calculate a maximum processing time to backup the one or more objects with a given number of disk agents.

* * * * *